(12) United States Patent
Ibarra Romero et al.

(10) Patent No.: US 8,096,587 B2
(45) Date of Patent: Jan. 17, 2012

(54) VACUUM BRAKE BOOSTER HOUSING AND NON-ROTATABLE CONNECTING ELEMENT

(75) Inventors: Peio Ibarra Romero, Pamplona (ES); Inaki Cia Vicuna, Pamplona (ES); Ernesto Bravo Villamayor, Pamplona (ES)

(73) Assignee: Lucas Automotive GmbH (DE)

( * ) Notice: Subject to any disclaimer, the term of this patent is extended or adjusted under 35 U.S.C. 154(b) by 621 days.

(21) Appl. No.: 11/795,466

(22) PCT Filed: Jan. 11, 2006
(Under 37 CFR 1.47)

(86) PCT No.: PCT/EP2006/000189
§ 371 (c)(1),
(2), (4) Date: May 30, 2008

(87) PCT Pub. No.: WO2006/077042
PCT Pub. Date: Jul. 27, 2006

(65) Prior Publication Data
US 2009/0293713 A1    Dec. 3, 2009

(30) Foreign Application Priority Data
Jan. 19, 2005    (DE) .......................... 10 2005 002 552

(51) Int. Cl.
*F16L 41/00*    (2006.01)
(52) U.S. Cl. .................. 285/216; 137/514; 137/526
(58) Field of Classification Search ............. 137/514, 137/526; 285/216
See application file for complete search history.

(56) References Cited

U.S. PATENT DOCUMENTS

| | | | | |
|---|---|---|---|---|
| 3,086,544 A | * | 4/1963 | Yost | 137/315.33 |
| 4,109,464 A | * | 8/1978 | Wickland | 60/397 |
| 4,628,959 A | * | 12/1986 | Parker et al. | 137/526 |
| 4,737,148 A | * | 4/1988 | Blake | 604/126 |
| 4,915,129 A | * | 4/1990 | Takayama | 137/514 |
| 5,291,916 A | * | 3/1994 | Kloosterman et al. | 137/112 |
| 5,954,481 A | * | 9/1999 | Baier et al. | 417/182 |
| 6,446,537 B1 | * | 9/2002 | Tsubouchi et al. | 91/376 R |
| 2004/0083884 A1 | | 5/2004 | Faller | |

FOREIGN PATENT DOCUMENTS

| | | |
|---|---|---|
| DE | 33 13 319 C1 | 5/1984 |
| DE | 40 03 957 A1 | 8/1991 |
| DE | 193 51 314 A1 | 5/2004 |

* cited by examiner

*Primary Examiner* — Aaron Dunwoody
(74) *Attorney, Agent, or Firm* — MacMillan, Sobanski & Todd, LLC

(57) ABSTRACT

A vacuum brake booster includes a housing and a bent connecting element for connecting the vacuum brake booster to a vacuum source, wherein the connecting element includes a first connecting piece which extends through an opening in the brake booster housing into a vacuum chamber of the vacuum brake booster, a second connecting piece for connecting the connecting element to the vacuum source, and a multi-part housing with a first housing part which carries the first connecting piece and a second housing part which carries the second connecting piece arranged at a first angle to the first connecting piece. To simplify automatic assembly, the position of the second housing part to the first housing part in relation to a second angle is rigidly fixed, and the shape of the opening in the brake booster housing and the cross-sectional shape of the first connecting piece are matched to each other in such a way that a rotation of the first connecting piece in the opening of the brake booster housing is at least substantially prevented.

16 Claims, 2 Drawing Sheets

VACUUM BRAKE BOOSTER HOUSING AND NON-ROTATABLE CONNECTING ELEMENT

CROSS-REFERENCE TO RELATED APPLICATIONS

This application is a National Stage of International Application No. PCT/EP2006/000189 filed Jan. 11, 2006, the disclosure of which is incorporated herein by reference, and which claimed priority to German Patent Application No. 10 2005 002 552.8 filed Jan. 19, 2005, the disclosure of which is incorporated herein by reference.

BACKGROUND OF THE INVENTION

The present invention relates to vacuum brake boosters comprising a housing and a bent connecting element for connecting the vacuum brake booster to a vacuum source, wherein the connecting element comprises a first connecting piece which extends through an opening in the brake booster housing into a vacuum chamber of the vacuum brake booster, and a second connecting piece for connecting the connecting element to the vacuum source. The connecting element has a multi-part housing with a first housing part which carries the first connecting piece and a second housing part which carries the second connecting piece arranged at a first angle to the first connecting piece.

Vacuum brake boosters have long been known and nowadays are used in virtually every motor vehicle which is fitted with a hydraulic braking system. They are used to keep a force that is to be applied by the driver of a vehicle to actuate the braking system at a comfortable, relatively low level. To achieve this the brake booster adds an auxiliary force, also called a servo force, generated by the brake booster to the actuating force applied by a driver, so the brake actuating force available at the wheel brakes is considerably boosted compared with the force applied by the driver.

Said auxiliary force is generated by a pressure differential in the housing of the brake booster which acts on a moving wall which is arranged between a working chamber and a vacuum chamber of the brake booster. To control the level of the pressure differential, and therewith the size of the auxiliary force generated by the brake booster, a control valve is used which on the one hand, can connect the working chamber of the brake booster to atmospheric pressure (or with overpressure) and on the other hand can connect the vacuum chamber of the brake booster to the working chamber.

So a vacuum brake booster can function, during operation its vacuum chamber must be connected to a vacuum source which constantly maintains a certain vacuum with respect to atmospheric pressure in the vacuum chamber. A vacuum that prevails in the intake section of a motor vehicle internal-combustion engine is often used as the vacuum source; in newer vehicles with their relatively lightly throttled engines a separate vacuum pump is increasingly being used as the vacuum source however.

In each case the vacuum chamber must be fluidically connected to the vacuum source. As a rule a hose is used which leads from the connecting element that is on the brake booster for connection of the hose to the vacuum source. For reasons of space the connecting element often has a bent design.

Whereas previously usually resilient hose assemblies were used which extended from the connecting element to the vacuum source, nowadays non-resilient, pre-shaped hose assemblies are increasingly being used, of which one end is shrunk onto the second connecting piece of the connecting element. If non-resilient, pre-shaped connecting hose assemblies of this type are to be automatically assembled on a vacuum brake booster, it is important that with each vacuum brake booster of a series the connecting element always has the same position with respect to the corresponding end of the connecting hose assembly. This is not the case with conventional vacuum brake boosters with a bent connecting element for connecting the brake booster to a vacuum source. Instead, with vacuum brake boosters of this type known from the prior art the connecting element has to be rotated into an appropriate position before it is connected to the connecting hose assembly.

The invention is therefore based on the object of providing a vacuum brake booster with a bent connecting element that is used for connection to a vacuum source, wherein the connecting element is adapted to be brought into a predefined, desired position and then reliably retains this position.

BRIEF SUMMARY OF THE INVENTION

Starting from the vacuum brake booster mentioned in the introduction this object is achieved in that with the housing of the connecting element the position of the second housing part relative to the first housing part is rigidly fixed in relation to a second angle, and in that the shape of the opening in the brake booster housing and the cross-sectional shape of the first connecting piece are matched to each other in such a way that a rotation of the first connecting piece in the opening of the brake booster housing is at least substantially prevented. The rigid fixing of the first and second housing parts to each other in relation to a second angle prevents an angular position, once adjusted, between the two housing parts from being unintentionally changed. The shapes of the opening for the connecting element in the brake booster housing and of the cross-section of the first connecting piece that have been matched with each other result in a form drag which secures the entire connecting element in a predefined position.

In a preferred embodiment of the vacuum brake booster according to the invention the housing of the connecting element comprises only the two said housing parts, and a connecting plane, in which the two housing parts abut each other, is circular. The two separate housing parts may thus be joined together and rotated relative to each other into the desired position and then be rigidly fixed. If the housing of the connecting element comprises more than two housing parts, and this is by all means possible, it must only be ensured that the position of the second housing part with respect to the first housing part can be rigidly fixed in order to obtain the advantages according to the invention. For rigid fixing of the two housing parts relative to the first housing part further housing parts that are arranged between two said housing parts may also be used.

In one embodiment in which the housing of the connecting element comprises only two housing parts, for reciprocal rigid fixing these are preferably welded, glued or crimped together in a predetermined position, which corresponds to the second angle. These fixing possibilities are particularly advantageous if the housing of the connecting element is made from plastics material.

In order, according to the invention, to prevent the connecting element rotating in relation to the brake booster housing basically all shapes of the opening in the brake booster housing and of the cross-section of the first connecting piece that are matched to each other are capable of leading to interlocking fit of the connection between the first connecting piece and the opening in the brake booster housing, into which opening the first connecting piece of the connecting element is introduced. In preferred embodiments of the vacuum brake booster according to the invention the shape of said opening and the cross-section of the first connecting piece is not circular but preferably oval. An oval cross-sectional shape of this kind may be produced in as problem-free a manner as a circular shape and still leads to the desired form drag of the connection between connecting element and brake booster housing which prevents rotation of the connecting element.

For reliable sealing of the first connecting piece in the associated opening of the brake booster housing a sealing collar made of elastomeric material is arranged on the first connecting piece in preferred embodiments and surrounds the edge of the opening of the brake booster housing. For reasons of good fit a sealing collar of this type preferably has a cross-sectional shape adapted to the cross-sectional shape of the first connecting piece.

According to a preferred embodiment of the vacuum brake booster according to the invention in which the housing of the connecting element comprises only two housing parts, adjacent to the connecting plane of its two housing parts this housing has an enlarged cavity. This cavity can be completely arranged in one housing part or the other but it can also be partially situated in one housing part and partially in the other. With an embodiment of this type the described cavity is preferably used for receiving a non-return valve which prevents atmospheric pressure from flowing into the vacuum chamber. When assembling the connecting element the non-return valve is first of all inserted into the cavity, or part of it, then the two housing parts are joined together and finally rigidly fixed to each other in the position corresponding to the desired second angle.

Other advantages of this invention will become apparent to those skilled in the art from the following detailed description of the preferred embodiments, when read in light of the accompanying drawings.

DETAILED DESCRIPTION OF THE INVENTION

Figure 1:
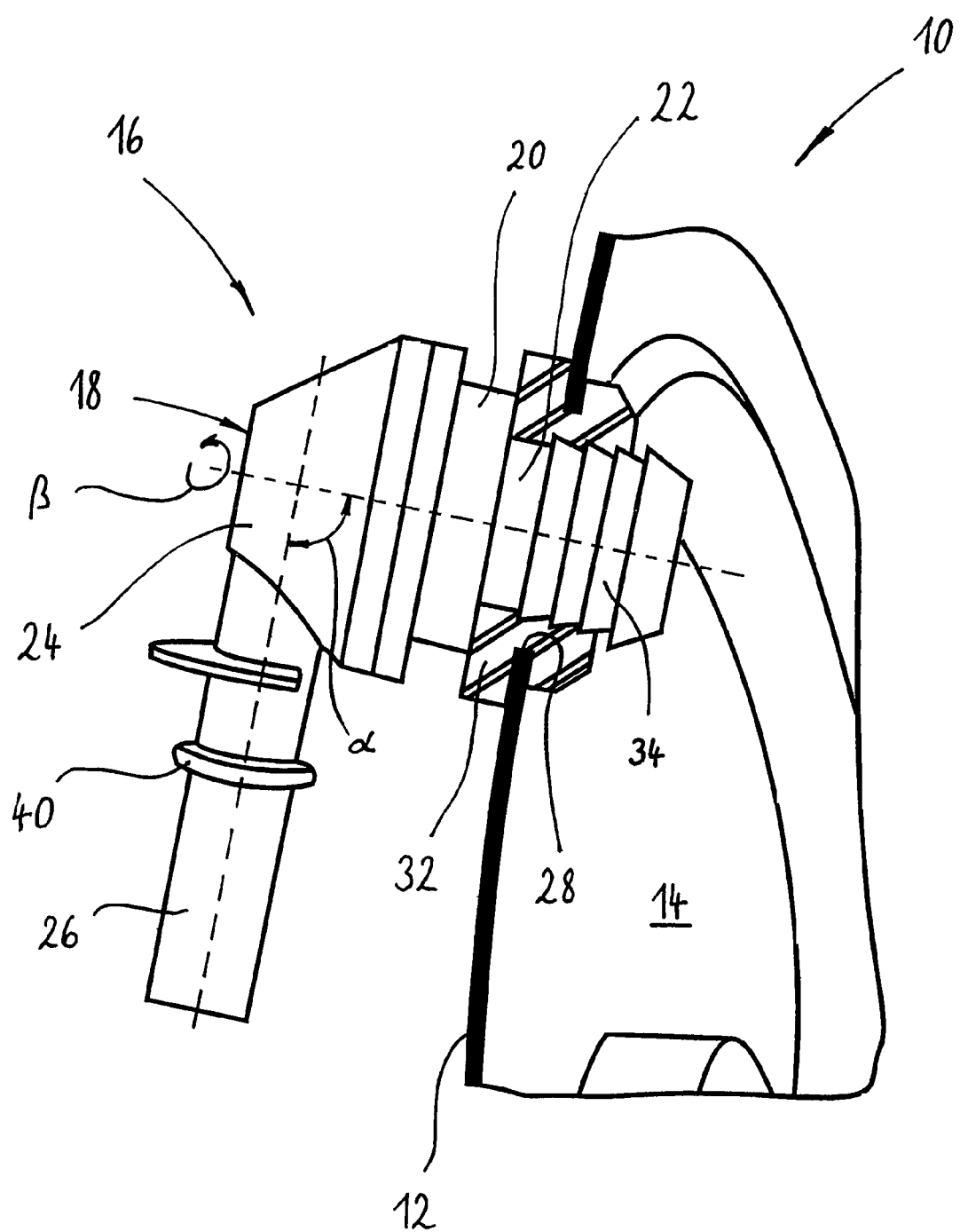
FIG. 1 shows in a cutaway and partially sectional illustration the region of a vacuum brake booster according to the invention in which a bent connecting element for connecting the vacuum brake booster to a vacuum source is secured in the brake booster housing.
Figure 2:
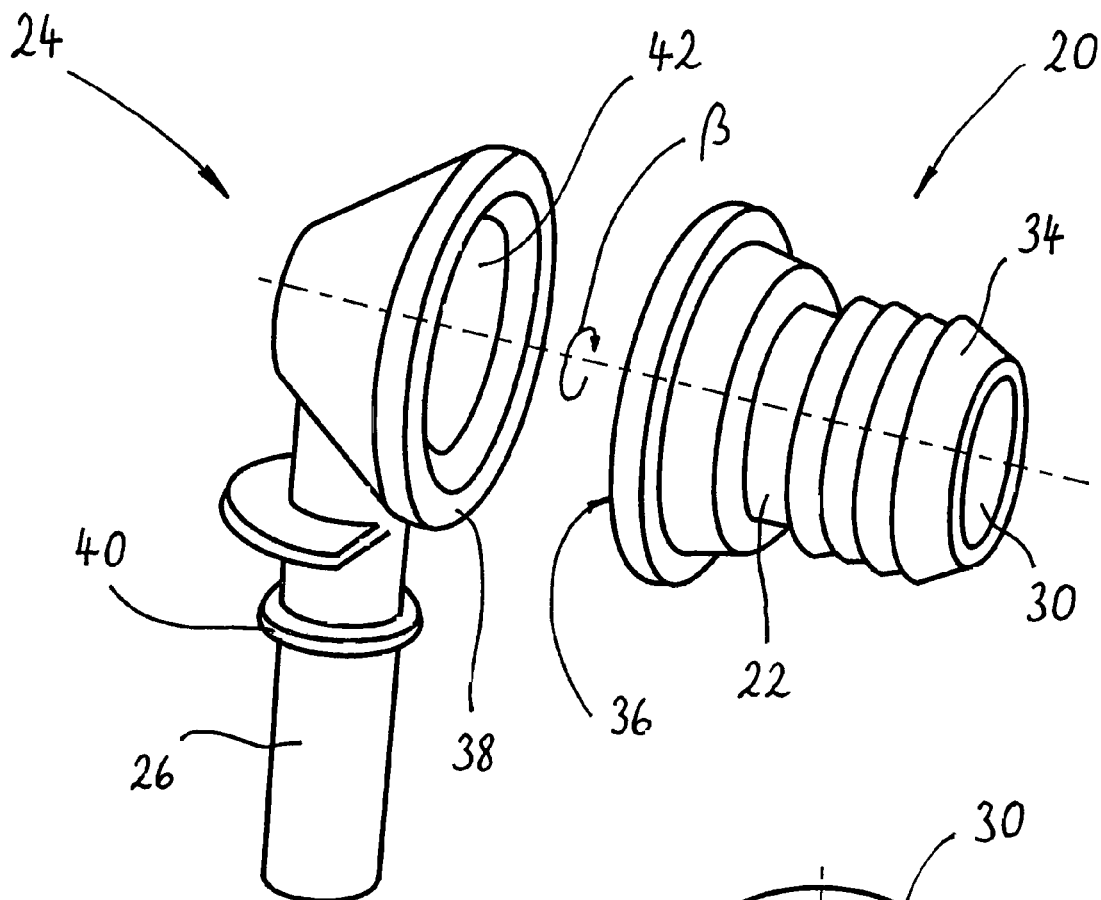
FIG. 2 shows the connecting element from FIG. 1 in a three-dimensional and exploded view.

FIG. 1 shows in a cutaway view the region that is of interest here of a vacuum brake booster 10 for a hydraulic motor vehicle braking system. The brake booster 10 has a bowl-shaped housing 12, of which the interior is divided by a moving wall (not shown in FIG. 1) into a vacuum chamber 14 and a working chamber (not visible in FIG. 1).

During operation of a vehicle in which the brake booster 10 is fitted, the vacuum chamber 14 is constantly connected via a connecting element 16 to a vacuum source, for example to the intake section of an internal-combustion engine that drives the vehicle, or to a separate vacuum pump, so a certain vacuum always prevails in the vacuum chamber 14.

If the driver of the motor vehicle wishes to brake, this wish is communicated to the brake booster 10 via an input member (not shown) which actuates a control valve (also not shown) of the brake booster in such a way that atmospheric pressure flows into the working chamber, in which approximately the same pressure prevails as in the vacuum chamber 14 before actuation of the brake booster (i.e. the working chamber is also evacuated). Consequently a pressure differential is established at the moving wall which, multiplied by the area of the moving wall, produces a servo or auxiliary force which is output by the brake booster to the braking system of the motor vehicle (conventionally to a master cylinder of the braking system which is connected downstream of the brake booster 10).

Said hollow connecting element 16 is used to connect the vacuum chamber 14 to a vacuum source. For reasons of space, i.e. in order to take up as little space as possible in the axial direction of the brake booster 10, a housing 18 of the connecting element 16 has a bent shape, wherein the bend in the illustrated embodiment is approximately 90 degrees.

In the illustrated embodiment the housing 18 of the connecting element 16 comprises a first housing part 20, which carries a first connecting piece 22, and a second housing part 24, which carries a second connecting piece 26 which extends at a first angle α to the first connecting piece 22. The angle α is approximately 90 degrees in the illustrated embodiment.

Figure 3:
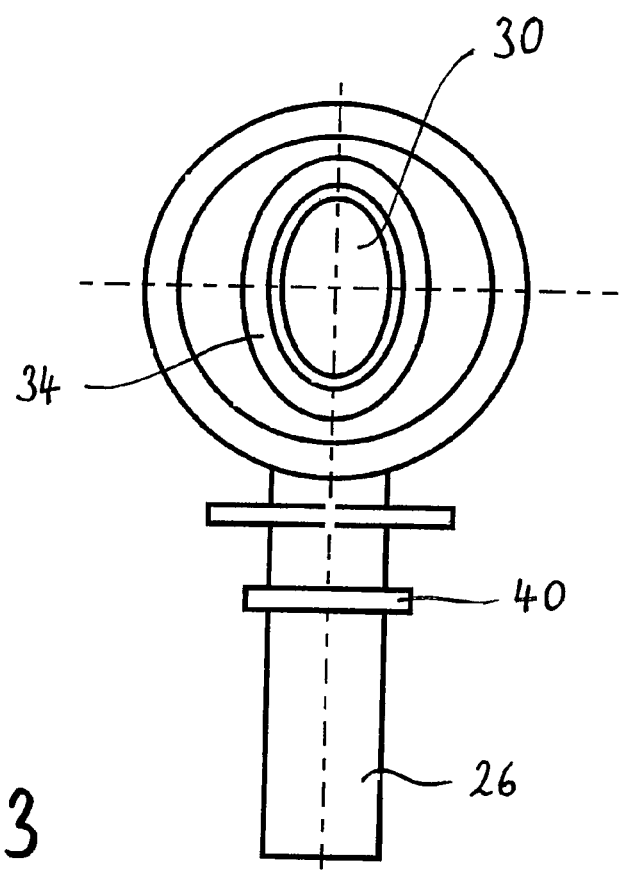
FIG. 3 shows the view from FIG. 2.

The first connecting piece 22 of the connecting element 16 extends through a, in this case oval, opening 28 in the brake booster housing 12 from the outside into the vacuum chamber 14. As may be seen in particular from FIG. 3 the first connecting piece 22 also has an oval cross-sectional shape, i.e. its outer form is oval in cross-section as well as a channel 30 formed therein. The latter is not imperative however, it is only important that the outer cross-sectional shape of the first connecting piece 22 is matched to the shape of the opening 28 in such a way that rotation of the first connecting piece 22 in the opening 28 is at least substantially prevented, i.e. the channel can readily also have a round cross-sectional shape.

In the illustrated embodiment a sealing collar 32 is arranged on the first connecting piece 22, the inner and outer cross-sections of which collar are also oval and therewith adapted to the shape of the first connecting piece 22, the collar surrounding the edge of the opening 28 on both sides, as shown in FIG. 1. As a result of this resilient sealing collar arranged between the opening 28 and the first connecting piece 22, the first connecting piece 22 can rotate slightly in the opening 28 with expenditure of force although a restoring force is then formed in the resilient material of the sealing collar 32 which, once the force applied for rotation ceases, returns the first connecting piece 22 to its original position again. Rotation of the first connecting piece 22 in the opening 28 is thereby substantially prevented.

To ensure improved retention of the sealing collar 32 on the first connecting piece 22 the latter is provided with a truncated cone-shaped ribbed section 34. With a suitable, i.e. sufficiently resilient, embodiment of the material of the first connecting piece 22 the connecting piece can also be arranged in the opening 28 of the brake booster housing 12 without insertion of a sealing collar.

The two housing parts 20 and 24 are made from plastics material in the embodiment shown in the figures, preferably by injection moulding. At its end remote from the first connecting piece 22 the first housing part 20 has a circular ring-shaped end face 36 which together with a circular ring-shaped end face 38 of the same size on the second housing part 24 determines a connecting plane in which the two housing parts 20 and 24 abut each other. In this connecting plane the two housing parts 20 and 24 can be rotated relative to each other about a second angle β in order to be able to adjust a desired angle β which the second connecting piece 26 should have relative to the first connecting piece 22. For this purpose the desired angle of rotation is adjusted during manufacture of the connecting element 16, at which angle the second connecting piece 26 extends in the desired orientation with respect to the first connecting piece 22 fixed in the opening 28. The two end faces 36 and 38 are then welded by means of ultrasound, so the position of the second housing part 24 relative to the first housing part 20 is accordingly rigidly fixed while maintaining the desired angle β. Instead of welding with ultrasound, gluing of the two end faces 36 and 38, crimping of the two housing parts 20 and 24 in the region of the two end faces 36 and 38 or interlocking latching which guarantees that the adjusted angle β is maintained may also be considered.

The second connecting piece 26 formed in one piece on the second housing part 24 has a conventional, hollow cylindrical shape and on the outside has a stop configured as an annular collar 40 which limits the extent to which a hose (not shown here) can be slipped on which provides a connection to the vacuum source.

The vacuum brake booster 10 thereby has a connecting element 16 which owing to fixing of the two angles α and β achieves clear and precisely reproducible alignment of the second connecting piece 26, and this is advantageous for automatic assembly of a brake booster in the motor vehicle or for automatic assembly of the hose on the second connecting piece 26.

In the region of the connecting plane arranged between the two end faces 36 and 38 there is moreover formed in the case of the illustrated connecting element 16 an inner cavity 42 which is enlarged in relation to the channel 30 extending through the connecting element 16, of which cavity one part is arranged in the first housing part 20 on this side of the connecting plane and another part is arranged in the second housing part 24 on the other side of the connecting plane in the illustrated embodiment. This inner cavity 42 is used for receiving a non-return valve (not shown) which prevents atmospheric pressure flowing into the vacuum chamber 14. The non-return valve is inserted in the cavity 42 before the two housing parts 20 and 24 are securely connected together.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Vacuum brake booster comprising
a housing and a bent connecting element for connecting the vacuum brake booster to a vacuum source, wherein the connecting element comprises
a first connecting piece which extends through an opening in the housing into a vacuum chamber of the vacuum brake booster, the opening defining an axis of rotation, and
a second connecting piece for connecting the connecting element to the vacuum source, and
a multi-part housing with a first housing part which carries the first connecting piece and a second housing part which carries the second connecting piece arranged at a first angle to the first connecting piece,
wherein the shape of the opening in the brake booster housing and the cross-sectional shape of the first connecting piece are matched to each other in such a way that a rotation of the first connecting piece in the opening of the brake booster housing about the axis of rotation is at least substantially prevented, and wherein
the position of the second housing part relative to the first housing part is rigidly fixed at a second angle.

2. Vacuum brake booster according to claim 1, wherein the multi-part housing of the connecting element comprises only the first and second housing parts and in that a connecting plane in which the first and second housing parts abut each other is circular ring-shaped.

3. Vacuum brake booster according to claim 2, wherein the first and second housing parts are one of welded, glued and crimped together in a predetermined position, which corresponds to the second angle.

4. Vacuum brake booster according to claim 1, wherein the opening of the brake booster housing and the cross-sectional shape of the first connecting piece are not circular.

5. Vacuum brake booster according to claim 1, wherein the opening of the brake booster housing and the cross-sectional shape of the first connecting piece are oval.

6. Vacuum brake booster according to claim 1, wherein a sealing collar is provided between the first connecting piece of the connecting element and the opening in the housing of the vacuum brake booster.

7. Vacuum brake booster according to claim 6, wherein the cross-sectional shape of the first connecting piece of the connecting element is the same as the cross-sectional shape of the opening of the sealing collar.

8. Vacuum brake booster according to claim 1, wherein the housing of the connecting element has an enlarged cavity provided therein, and wherein opening of the brake booster housing and the cross-sectional shape of the first connecting piece are oval.

9. Vacuum brake booster comprising
a housing defining a vacuum chamber; and
a connecting element for connecting the vacuum brake booster to a vacuum source, the connecting element including
a first connecting piece that extends through an opening in the housing into the vacuum chamber, the opening defining an axis of rotation,
a second connecting piece that is adapted to connect the connecting element to the vacuum source, and
a multi-part housing including a first housing part which carries the first connecting piece and a second housing part which carries the second connecting piece arranged at a first angle to the first connecting piece,
wherein the shape of the opening in the brake booster housing and the cross-sectional shape of the first connecting piece are matched to each other in such a way that rotation of the first connecting piece in the opening of the brake booster housing about the axis of rotation is at least substantially prevented, and wherein
the position of the second housing part relative to the first housing part is rigidly fixed at a second angle.

10. Vacuum brake booster according to claim 9, wherein the multi-part housing of the connecting element comprises only the first and second housing parts and in that a connecting plane in which the first and second housing parts abut each other is circular ring-shaped.

11. Vacuum brake booster according to claim 10, wherein the first and second housing parts are one of welded, glued and crimped together in a predetermined position, which corresponds to the second angle.

12. Vacuum brake booster according to claim 9, wherein the opening of the brake booster housing and the cross-sectional shape of the first connecting piece are not circular.

13. Vacuum brake booster according to claim 9, wherein the opening of the brake booster housing and the cross-sectional shape of the first connecting piece are oval.

14. Vacuum brake booster according to claim 9, wherein a sealing collar is provided between the first connecting piece of the connecting element and the opening in the housing of the vacuum brake booster.

15. Vacuum brake booster according to claim 14, wherein the cross-sectional shape of the first connecting piece of the connecting element is the same as the cross-sectional shape of the opening of the sealing collar.

16. Vacuum brake booster according to claim 9, wherein the housing of the connecting element has an enlarged cavity provided therein, and wherein opening of the brake booster housing and the cross-sectional shape of the first connecting piece are oval.

* * * * *